United States Patent [19]

Ogawa et al.

[11] Patent Number: 4,479,084
[45] Date of Patent: Oct. 23, 1984

[54] SECONDARY ARC EXTINCTION DEVICE

[75] Inventors: Yasuhiro Ogawa, Kamagaya; Isao Fukui, Tokyo, both of Japan

[73] Assignee: Tokyo Shibaura Denki Kabushiki Kaisha, Kawasaki, Japan

[21] Appl. No.: 400,584

[22] Filed: Jul. 21, 1982

[30] Foreign Application Priority Data

Jul. 30, 1981 [JP] Japan .................................. 56-119762

[51] Int. Cl.³ .......................... H02J 3/18; G05F 1/70
[52] U.S. Cl. ..................................... 323/210; 361/47; 361/66
[58] Field of Search ............... 323/208, 209, 210, 211, 323/246, 300; 361/47, 48, 62-68, 170, 187

[56] References Cited

U.S. PATENT DOCUMENTS

| | | | |
|---|---|---|---|
| 3,932,808 | 1/1976 | Frank | 323/210 |
| 4,096,431 | 6/1978 | Hammarlund | 323/210 |
| 4,314,301 | 2/1982 | Kondow et al. | 361/65 |

OTHER PUBLICATIONS

"Soviet Inventions Illustrated", Week C 30, Sep. 3, 1980, Sec. X 13 & SU A - 702 447.
"Soviet Inventions Illustrated", Week C 15, May 21, 1980, Secs. R 51, R 53 & SU - A - 672 700.
EPRI/IREQ, pp. 348-359, Sep. 19-21, 1979, Quebec, Canada.

Primary Examiner—Peter S. Wong
Attorney, Agent, or Firm—Oblon, Fisher, Spivak, McClelland & Maier

[57] ABSTRACT

A secondary arc extinction device is disclosed for an electrical power system which includes a bus bar, an electrical power line connected to the bus bar and a protective relay device. A first reactance is provided with each phase so that one terminal of the first reactance is connected to a respective phase of the power line. A transformer which has a primary winding connected between the second terminal of the first reactance and ground is further provided and a second reactance is connected to the secondary winding of the transformer. A control device provides for control of the second reactance in response to a signal from the protective relay.

6 Claims, 8 Drawing Figures (a)

(b)

1

SECONDARY ARC EXTINCTION DEVICE

BACKGROUND OF THE INVENTION

1. Field of the Invention

The present invention relates to a secondary arc extinction device in a multi-conductor transmission line electric power system in which an electrostatic coupling between the lines is strong and problems are thereby caused.

2. Description of the Prior Art

The above-noted problems are that the arc generated by back flashover at the installation of the insulator for the transmission line (which is hereinafter referred to as "secondary arc") is not extinguished to disable the reclosing at a high speed or it is impossible to take a sufficient non-voltage period of time by the fact that the induction electric current or the induction voltage is supplied from the whole phase or the whole line due to the electrostatic coupling even after the circuit breakers at both ends of the transmission line are interrupted when there is caused a short circuit due to the damage caused by lightning or the like at the insulator installation.

Nextly described with the aid of FIGS. 1, 2a, 2b, 3 and 4 is the conventional electric power transmission line system. Specifically, a power transmission line (R, S & T phases) is considered wherein the fixed reactor with zero phase, i.e., the reactor between the neutral point of the star-connection and ground, compensation is provided as shown in FIG. 1. In FIG. 1,

- $Y_{ca}$: power transmission line a phase ground admittance,
- $Y_{cb}$: power transmission line b phase ground admittance,
- $Y_{cc}$: power transmission line c phase ground admittance,
- $Y_{cab}$: power transmission line a-b phase interphase admittance
- $Y_{cbc}$: power transmission line b-c phase interphase admittance
- $Y_{cca}$: power transmission line c-a phase interphase admittance
- $Y_{La}$: $1/\omega \cdot La$: reactor a phase admittance,
- $Y_{Lb}$: $1/\omega \cdot Lb$: reactor b phase admittance,
- $Y_{Lc}$: $1/\omega \cdot Lc$: reactor c phase admittance,
- $Y_g$: $1/\omega \cdot Lg$: neutral point reactor admittance,
- $L_a$: reactor a phase reactance,
- $L_b$: reactor b phase reactance,
- $L_c$: reactor c phase reactance,
- $L_g$: neutral point reactor reactance, In addition, the reactor with zero phase compensation which is shown in FIG. 2(a) can be resolved into components between lines, as well as ground components as shown in FIG. 2(b). In FIG. 2(b), if it is assumed that $m = Y_{La} + Y_{Lb} + Y_{Lc} + Y_g$, each admittance will be obtained as the following:

$Y_{Lab} = Y_{La} \cdot Y_{Lb}/m$ $Y_{Lbc} = Y_{Lb} \cdot Y_{Lc}/m$ $Y_{Lca} = Y_{Lc} \cdot Y_{La}/m$ $Y_{ag} = Y_a \cdot Y_g/m$ $Y_{bg} = Y_b \cdot Y_g/m$ $Y_{cg} = Y_c \cdot Y_g/m$ On the other hand, as shown in FIG. 3, there is considered a state in which the a phase circuit breaker CB is opened after an a phase ground short-circuit problem has occurred. Then, an induced electric current $i_a$ flows into the problem point A from the healthy phases b and c by way of $Y_{cab}$ and $Y_{cca}$. In addition, the condition of the recovery voltage $v_r$ and the secondary arc current $i_a$ for the continuation of the secondary arc is dependent upon the weather conditions, the primary arc current, the time, the design of the insulator of the line, etc. In other words, it becomes possible to extinguish the secondary arc if it becomes possible to limit the secondary arc current and the recovery voltage in a range in which either the recovery voltage $v_r$ or the secondary arc current $i_a$ is small.

Similarly, the induction via the power transmission line phase ground admittances $Y_{caa'}$ $Y_{cab'}$ and $Y_{cac'}$ from the healthy transmission line is received in the case of a juxtaposed pair of transmission lines as shown in FIG. 4, but it is difficult to compensate for the capacitance between the lines with the reactor which is constituted as shown in FIG. 1.

SUMMARY OF THE INVENTION

Accordingly, one object of the present invention is to provide a novel secondary arc extinction device in an electric power system in which it is possible to shorten the period of time for extinction of secondary arcs caused by all kinds of problems.

Another object is to provide a new and improved power transmission system, especially a UHV system, provided with active countermeasures for the extinction of secondary arcs.

These and other objects are achieved according to the invention by providing a novel secondary arc extinction device in an electric power system in which the reactance value of neutral point reactor is made variable in a continuous manner by effecting thyristor phase control and the neutral point reactor which is connected between the neutral point of the star-connection phase reactor and ground (as seen from the system, and which is hereinafter referred to as "reactor with zero phase compensation), and in which the reactance value of neutral point reactor is capable of being controlled to the most optimum reactance value for extinction of secondary arcs. Contrary to the conventional system in which high-speed multi-phase reclosing is carried out with nothing as a countermeasure, the present invention provides an active countermeasure for extinction of secondary arcs in the UHV power transmission system, versus the mere provision of a fixed reactor with zero phase compensation as is otherwise conventional.

Briefly, in accordance with one embodiment of this invention, a secondary arc extinction device in an electric power system is provided which includes a bus bar; an electric power line connected to the bus bar; protective relaying means connected to the bus bar; first reactance means provided with each phase, each one terminal of the first reactance means being connected to respective electric power line; a transformer having a primary winding and a secondary winding, the primary winding being connected between each the other terminal (of the first reactance means and ground; second reactance means connected to the secondary winding; and means for controlling the reactance of the second reactance means in response to the protective relaying means.

BRIEF DESCRIPTION OF THE DRAWINGS

A more complete appreciation of the invention will be readily obtained as the same becomes better understood by reference to the following detailed description when considered in connection with the accompanying drawings, wherein.

DETAILED DESCRIPTION OF THE PREFERRED EMBODIMENTS

Figure 3:
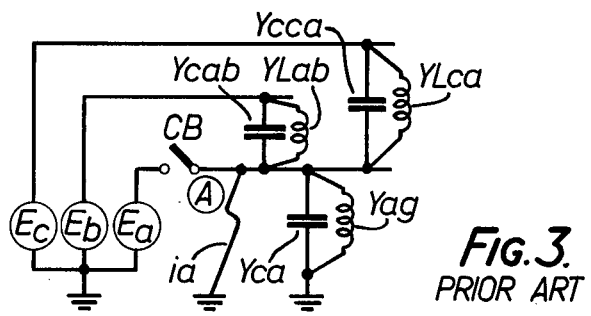
FIG. 3 is a diagram showing when an a phase 1 ground short-circuit occurs in the conventional electric power transmission line.
Figure 4:
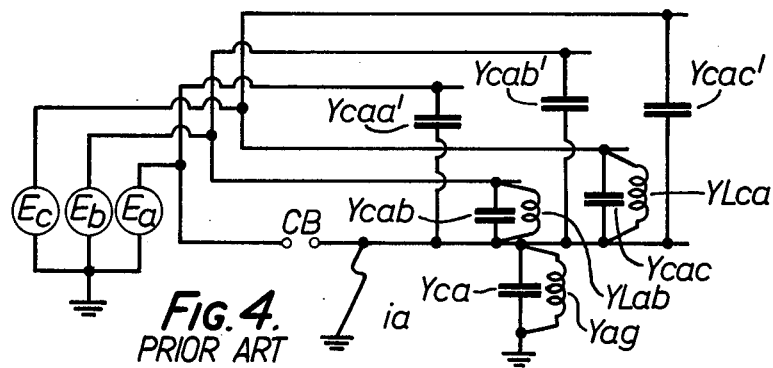
FIG. 4 is a diagram showing when an a phase 1 ground short-circuit occurs in the conventional juxtaposed multi-line power transmission system.

The present invention shortens the period of time for extinction of secondary arc with the reactor with zero phase compensation by producing parallel resonance in the circuit of $Y_{cca}$ and $Y_{Lca}$, $Y_{cab}$ and $Y_{Lab}$ respectively in the circuit which is shown in FIG. 3, so that the impedance becomes infinite, thereby making zero the electric current between the (A) point and ground and the recovery voltage, or making them approach zero. In other words, it becomes possible to make zero both the secondary arc current and the recovery voltage in the transmission line of one line by choosing the reactance of the reactor in such a way that the capacitance between the lines and the reactance between the lines resonate in parallel.

The continuous control of the reactive power is also the continuous control of the reactance value. The continuous reactance control ability of the thyristor phase control reactor is utilized according to the present invention.

Referring now to the drawings, wherein like reference numerals and letters designate identical or corresponding parts throughout the several views, and more particularly to FIG. 5 thereof, one embodiment in accordance with the invention will be explained with reference to the accompanying drawings.

Figure 5:
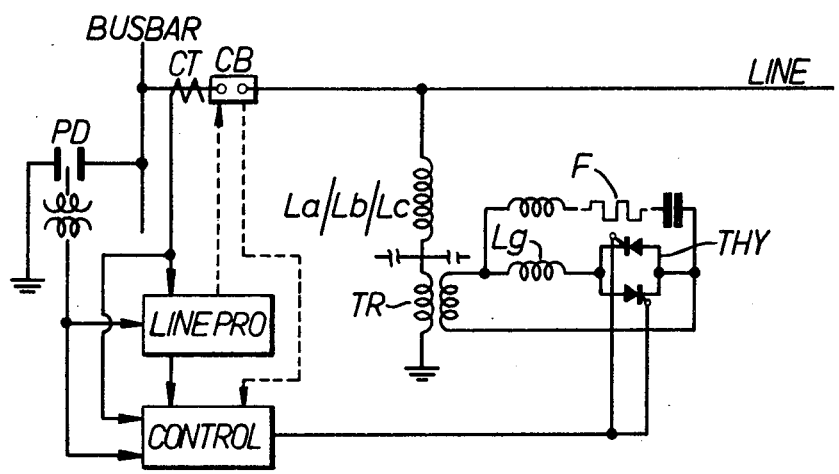
FIG. 5 is a circuit diagram showing one embodiment of secondary arc extinction device in accordance with the present invention.

FIG. 5 shows an example of a secondary arc extinction device in an electric power system in accordance with the present invention. In FIG. 5, there is provided a thyristor phase control reactor with zero phase compensation at a service entrance of an electric station, a substation or a connection station between the bus bar and the line. This reactor is collectively capable of varying the reactance value of neutral point in a continuous manner by effecting the phase control of the thyristor.

A protective relay LINE PRO, as well known, generates a trip signal (dotted line) to be transmitted to a circuit breaker CB in response to outputs from a current transformer CT and a potential transformer PD when a ground fault occurs in a range to be protected.

Figure 1:
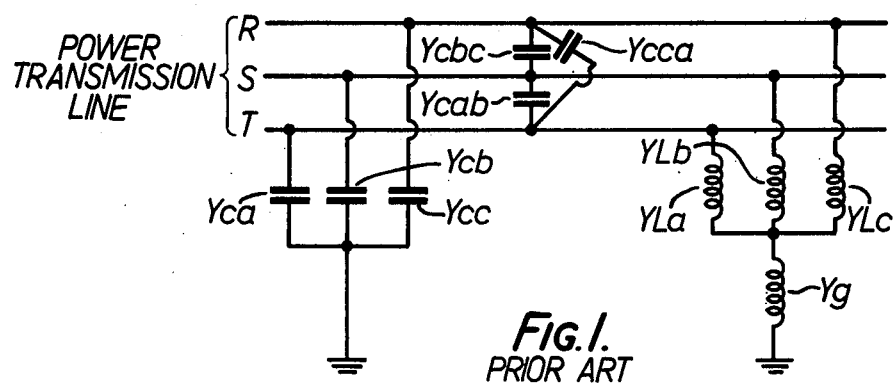
FIG. 1 is a circuit diagram of a conventional electric power transmission line with a fixed reactor with zero phase compensation.
Figure 2:
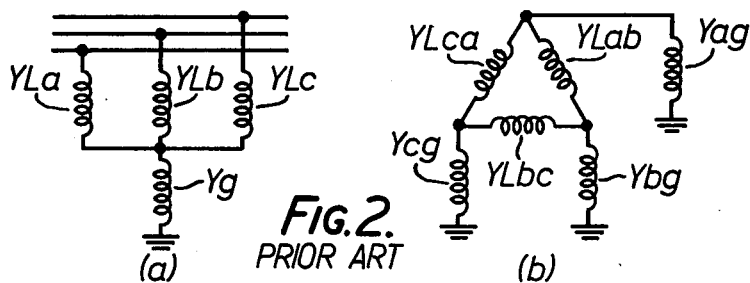
FIGS. 2(a) and 2(b) are respectively circuit diagrams of a part of FIG. 1 and an equivalent circuit of a portion of the circuit of FIG. 2(a)

As described in FIGS. 1 and 2, free terminals of a star-connection phase reactor are connected to each phase line (only one phase is shown in FIG. 5 for the sake of brevity). A primary winding of a transformer TR for dropping voltage are connected between the neutral point of the star-connection phase reactor and ground.

The secondary winding of the transformer TR is connected to a series connection of a neutral point reactor $L_g$ and anti-parallel connected thyristors THY and a filter F.

A control device CONTROL receives outputs from the current transformer CT, the potential transformer PD, the protective relay LINE PRO and an auxiliary contact (b contact) of circuit breaker CB. Control device CONTROL generates a signal to change the conduction angle of thyristor THY to a predetermined value when a fault occurs, as described hereinafter with regard to FIG. 7 in more detail.

When a fault occurs, the reactance of the transformer TR of neutral point is controlled by the thyristor THY so as to change the reactance to a predetermined value.

As a result, it is possible to extinguish the secondary arc so that the capacitance between the lines and the controlled reactance between the lines resonate in parallel.

Figure 6:
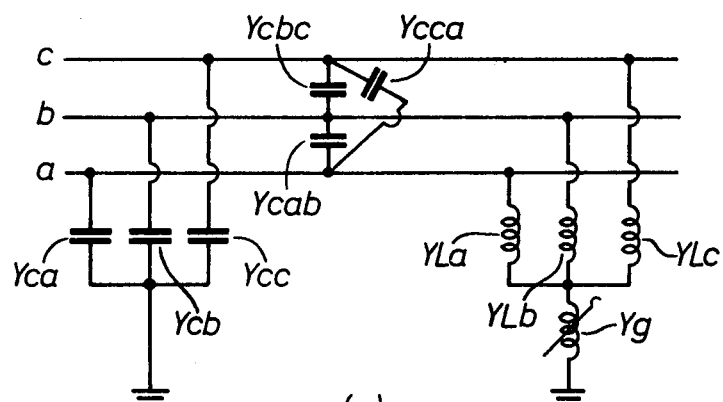
FIGS. 6(a) and 6(b) are circuit diagrams of electric power transmission lines employing the active countermeasures of the present invention.
Figure 6:
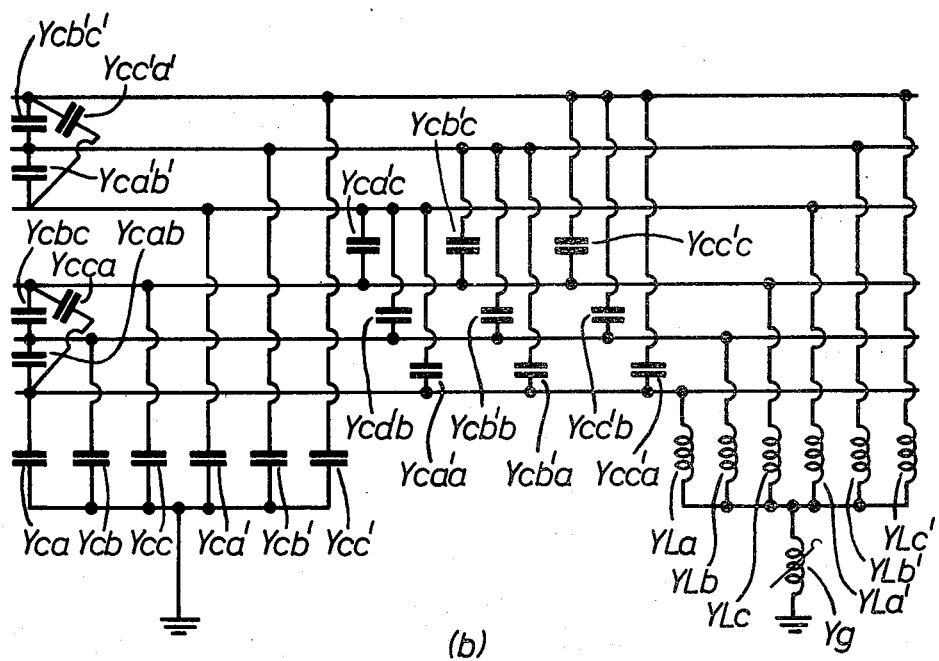

For example, the thyristor phase control reactor with zero phase compensation is constituted in such a way that only the interphase capacitance of its own line is compensated for as shown in FIG. 6(a) or in such a way that even the capacitance between the lines is compensated for as shown in FIG. 6(b).

Figure 7:
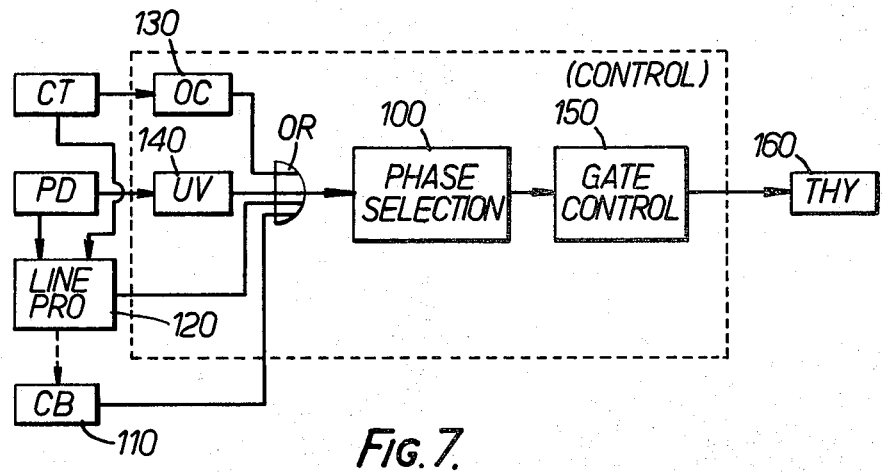
FIG. 7 is a block diagram of one embodiment of a control device shown in FIG. 5.

FIG. 7 is an example of the above mentioned control means CONTROL in accordance with which the troubled phase is identified at PHASE SELECTION portion by the operative condition of the circuit breaker CB or the operative condition of the protective relay LINEPRO of a line or a troubled phase selection relay such as over current relay OC, undervoltage relay UV or the like and the gate ignition angle of the thyristor THY is determined at the GATE CONTROL portion so as to transmit an ignition signal to the thyristor THY. Now, if a gate ignition angle is set in advance which is in correspondence with the most suitable reactance value of neutral point which is capable of compensating for the interphase capacitance or the capacitance between the lines by the condition of the troubled phase, it becomes possible to instantaneously respond in determining the ignition angle of the thyristor gate at the GATE CONTROL portion.

Thus, the secondary arc extinction device in an electric power system is constituted in such a way that a thyristor phase control reactor with zero phase compensation is provided at a service entrance of a line in an electric place, a trouble phase is identified by a trip signal condition of a protective relay LINE PRO for a line or by the operative condition of a relay OC, UV for selecting a trouble phase or by the operative condition (b contact) of the circuit breaker CB and a reactance value of neutral point is controlled to be a predetermined value so as to match the parallel resonance condition above-described.

Therefore, it becomes possible to make short the period of time for extinction of the secondary arc in the power transmission system and furthermore, the reclosing is made possible if the means for extinction of secondary arc as mentioned above is employed. Although it is impossible to gather together the reactors for reactive power control of the system at the service entrance of the line in the case of the fixed reactor, it becomes possible to do so in accordance with the device of this invention because the reactance value is made variable. In addition, it is possible to constitute as a combination of a thyristor phase control reactor and a circuit breaker switching control capacitor, in other words, to constitute in combination with the capacitor equipment. Therefore, it is possible to provide the reactive power control means in such a way as to be gathered together at the service entrance of the line, which will also become possible to be used at the time when any trouble is caused for the line so as to shorten the period of time for extinction of the secondary arc. In addition, since it is possible to use the floating capacitance of the line as the advance capacitance by controlling the reactor current, it becomes possible for the electric station as a whole to save the capacitor, which is quite advantageous from an economical viewpoint.

Furthermore, it is possible to provide a compact secondary arc extinction device as a whole because it is satisfied by one thyristor phase control reactor at a neutral point between the neutral point of star-connection phase reactor and ground. As seen from above description, a secondary arc extinction device according to this invention has an economical advantageous due to reduction of a number of parts.

The present invention is not limited to the above mentioned embodiments but may be varied and carried out in various manners without varying the gist of the invention.

In accordance with the present invention as mentioned above, since a thyristor phase control reactor with zero phase compensation is provided at a service entrance of a line in an electric installation, a problem phase is identified by a trip signal condition of a relay for protecting a line or by the operative condition of a relay for selecting a problem phase or by the operative condition of a circuit breaker, and a reactance value of the reactor of neutral point is controlled to a predetermined value which is most suitable, it becomes possible to provide a means for extinction of a secondary arc in an electric power system which is very reliable and in accordance with which it is possible to make short the period of time for extinction of the secondary arc irrespective of the cause thereof.

Obviously, numerous additional modifications and varitions of the present invention are possible in light of the above teachings. It is therefore to be understood that within the scope of the appended claims, the invention may be practiced otherwise than as specifically described herein.

What is claimed is:

1. A secondary arc extinction device in a 3-phase electrical power system comprising:
   a bus bar;
   a 3-phase electric power line connected to said bus bar;
   protective relaying means connected to said bus bar which outputs a signal indicating a ground fault in said 3-phase power line;
   a plurality of first reactance means one of said plurality of first reactance means being provided with each phase, one terminal of each of said first reactance means being connected to a respective electrical power phase;
   a transformer having a primary winding and a secondary winding, said primary winding being connected between the other terminal of each of said first reactance means and ground;
   second reactance means connected to said secondary winding of said transformer; and
   means for controlling the reactance of said second reactance means in response to the output of said protective relaying means in order to extinguish the secondary arc occurring as a result of said ground fault by providing that the capacitance between the phases of said power line and the reactance between the phases of said power line resonate in parallel.

2. A secondary arc extinction device as recited in claim 1, wherein said second reactance means comprises a semiconductor switching element, and a reactor connected in series therewith.

3. A secondary arc extinction device as recited in claim 2, wherein said semiconductor switching element comprises anti-parallel connected thyristors.

4. A secondary arc extinction device as recited in claim 1, further comprising a filter connected to said secondary winding of said transformer.

5. A secondary arc extinction device in a 3-phase electrical power system comprising:
   a bus bar;
   a 3-phase electric power line connected to said bus bar;
   protective relaying means connected to said bus bar which outputs a signal indicating a ground fault in said 3-phase power line;
   a plurality of first reactance means one of said plurality of first reactance means being provided with each phase, one terminal of each of said first reactance means being connected to a respective electrical power phase;
   a transformer having a primary winding and a secondary winding, said primary winding being connected between the other terminal of each of said first reactance means and ground;
   second reactance means connected to said secondary winding of said transformer;
   a current transformer connected to said bus bar;
   a potential transformer connected to said bus bar;
   a circuit breaker having an auxiliary contact connected to said protection relaying means and activated by said protection relaying means;
   an OR gate connected to said current transformer, said potential transformer, said protective relaying means and said auxiliary contact of said circuit breaker; and
   means for setting the firing angle of said thyristors of said second reactance means to a predetermined value in response to an output of said OR gate.

6. A secondary arc extinction device in a 3-phase electrical power system comprising:
   a bus bar;
   a 3-phase electic power line connected to said bus bar;
   protective relaying means connected to said bus bar which outputs a signal indicating a ground fault in said 3-phase power line;

a plurality of first reactance means one of said plurality of first reactance means being provided with each phase, one terminal of each of said first reactance means being connected to a respective electrical power phase;

a transformer having a primary winding and a secondary winding, said primary winding being connected between the other terminal of each of said first reactance means and ground;

second reactance means connected to said secondary winding of said transformer wherein said second reactance means comprises anti-parallel connected thyristors and a reactor connected in series therewith; and means for controlling the reactance of said second reactance means in response to the output of a OR gate in order to extinguish the secondary arc occurring as a result of said ground fault by providing that the capacitance between the phases of said power line and the reactance between the phases of said power line resonate in parallel.

* * * * *